US011081740B2

(12) United States Patent
Uchiyama et al.

(10) Patent No.: US 11,081,740 B2
(45) Date of Patent: Aug. 3, 2021

(54) POWER STORAGE DEVICE

(71) Applicant: TOYOTA JIDOSHA KABUSHIKI KAISHA, Toyota (JP)

(72) Inventors: Toshio Uchiyama, Toyota (JP); Shigeyuki Inoue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

(21) Appl. No.: 16/365,155

(22) Filed: Mar. 26, 2019

(65) Prior Publication Data

US 2019/0312320 A1 Oct. 10, 2019

(30) Foreign Application Priority Data

Apr. 6, 2018 (JP) .............................. JP2018-073660

(51) Int. Cl.
| | |
|---|---|
| *H01M 10/613* | (2014.01) |
| *H01M 10/6561* | (2014.01) |
| *H01M 50/20* | (2021.01) |
| *H01M 50/30* | (2021.01) |
| *H01M 10/625* | (2014.01) |

(52) U.S. Cl.
CPC ....... *H01M 10/613* (2015.04); *H01M 10/625* (2015.04); *H01M 10/6561* (2015.04); *H01M 50/20* (2021.01); *H01M 50/394* (2021.01); *H01M 2220/20* (2013.01)

(58) Field of Classification Search
CPC ............. H01M 10/613; H01M 10/625; H01M 10/6561; H01M 2/1077; H01M 2/1264; H01M 2220/20; H01M 50/394; H01M 50/20
See application file for complete search history.

(56) References Cited

U.S. PATENT DOCUMENTS

2012/0189886 A1* 7/2012 Tsumaki ............... H01M 50/20
429/87
2018/0261809 A1* 9/2018 Choi .................. H01M 10/0525

FOREIGN PATENT DOCUMENTS

| JP | 2011-173447 A | 9/2011 | |
|---|---|---|---|
| JP | 2012-109185 A | 6/2012 | |
| JP | 2014-201301 A | 10/2014 | |
| JP | 2014-238932 A | 12/2014 | |
| KR | 20160107581 A | * 9/2016 | ........ H01M 10/0525 |

OTHER PUBLICATIONS

EPO machine generated English translation of JP 2014-201301A (Year: 2014).*

* cited by examiner

*Primary Examiner* — Christopher P Domone
*Assistant Examiner* — Kimberly Wyluda
(74) *Attorney, Agent, or Firm* — Sughrue Mion, PLLC

(57) ABSTRACT

A power storage device includes: a power storage module; a housing case having a housing space formed therein and configured to house the power storage module in the housing space; a cooler arranged in the housing case and configured to cool air sent toward the power storage module; a storage portion configured to store condensation water generated as a result of cooling by the cooler; and an air permeable film configured to allow a vapor generated from the condensation water stored in the storage portion to pass therethrough. The storage portion and the air permeable film are provided in a separated space separated from the housing space. The vapor passes through the separated space and reaches the air permeable film.

3 Claims, 7 Drawing Sheets

POWER STORAGE DEVICE

This nonprovisional application is based on Japanese Patent Application No. 2018-073660 filed on Apr. 6, 2018 with the Japan Patent Office, the entire contents of which are hereby incorporated by reference.

BACKGROUND

Field

The present disclosure relates to a power storage device, and particularly to a power storage device mounted on a vehicle.

Description of the Background Art

As a power storage device configured to supply electric power to a motor, a battery pack is mounted on an electric vehicle or a hybrid vehicle. The battery pack mainly includes a cell stack, and a housing case configured to house the cell stack. The output characteristics of the cell stack decrease with an increase in temperature of the cell stack, and thus, the cell stack is cooled in the housing case.

For example, Japanese Patent Laying-Open No. 2012-109185 discloses a battery pack configured to be capable of cooling a cell stack.

In the battery pack disclosed in Japanese Patent Laying-Open No. 2012-109185, the air in a housing case sucked by a blower fan unit is cooled by a cooler, and the cooled air is sent toward the cell stack. At this time, the condensation water generated at and dripping from the cooler is turned into a fine mist or vaporized by a humidifier, and is released into the housing case.

SUMMARY

However, in the battery pack disclosed in Japanese Patent Laying-Open No. 2012-109185, the humidifier is placed, which leads to an increase in manufacturing cost. In addition, a vapor evaporated from the condensation water is released into the housing case, which leads to an increase in humidity in the housing case. As a result, condensation occurs in the housing case, and thus, it is concerned that the condensation water makes a short circuit in the cell stack and an electronic device arranged in the housing case.

The present disclosure has been made in light of the above-described problem, and an object of the present disclosure is to provide a power storage device capable of discharging a vapor from condensation water generated as a result of cooling by a cooler to the outside with a simple configuration.

A power storage device based on the present disclosure includes: a power storage module; a housing case having a housing space formed therein and configured to house the power storage module in the housing space; a cooler arranged in the housing case and configured to cool air sent toward the power storage module; a storage portion configured to store condensation water generated as a result of cooling by the cooler; and an air permeable film configured to allow a vapor generated from the condensation water stored in the storage portion to pass therethrough. The storage portion and the air permeable film are provided in a separated space separated from the housing space. The vapor passes through the separated space and reaches the air permeable film.

With the above-described configuration, the condensation water generated as a result of cooling by the cooler can be stored in the storage portion provided in the separated space separated from the housing space in the housing case, and the vapor generated from the condensation water can be discharged from the air permeable film to the outside through the separated space separated from the housing space.

Therefore, storage of the condensation water in the housing space in the housing case and accumulation of the vapor generated from the condensation water in the housing space can be suppressed, and adhesion of the condensation water to the housed power storage module and the like can be suppressed. As a result, a short circuit of the power storage module can be suppressed. In addition, with such a configuration that the vapor reaches the air permeable film provided in the separated space, submersion of the air permeable film in the condensation water can be suppressed, and the vapor can be reliably discharged outside the storage portion.

By providing the separated space separated from the housing space as described above, the vapor from the condensation water stored in the storage portion can be discharged outside, without requiring a humidifier and the like, and thus, the vapor from the condensation water can be discharged outside with a simple configuration. Furthermore, an increase in humidity in the housing space can be suppressed, and re-condensation of the vapor generated in the housing space can be suppressed.

In the power storage device based on the present disclosure, the housing case may include a bottom portion provided with an opening. In this case, the storage portion preferably includes a bottom wall portion provided to cover the opening from a lower side of the bottom portion and facing the bottom portion, and a peripheral wall portion provided to rise from a peripheral edge of the bottom wall portion and connected to the bottom portion. Furthermore, the bottom wall portion preferably includes a storage surface defining a storage region where the condensation water having passed through the opening is stored, and a placement surface located above the storage surface and having the air permeable film placed thereon.

With the above-described configuration, the storage portion is provided to cover the opening from the lower side, and thus, the separated space can be easily formed by the storage portion. In addition, the condensation water going downward by gravity can be moved from the opening provided in the bottom portion of the housing case toward the storage portion. Furthermore, the placement surface on which the air permeable film is placed is provided above the storage surface, and thus, submersion of the air permeable film in the condensation water can be suppressed.

The power storage device based on the present disclosure may further include a protective member provided to cover the storage portion from the lower side.

With the above-described configuration, the storage portion is protected by the protective member and interference with a road surface can be suppressed. In addition, the air permeable film is covered with the protective member, and thus, adhesion of a foreign substance such as mud on the road surface splashed by a wheel to the air permeable film can be suppressed. As a result, a reduction in vapor discharge performance can be suppressed.

The power storage device based on the present disclosure may further include an air duct arranged in the housing case so as to be located above the opening, and configured to allow the air sent toward the power storage module to flow therethrough. In this case, the cooler is preferably arranged in the air duct, and the air duct is preferably provided with an outlet configured to guide the condensation water to the opening. Furthermore, a seal member configured to hermetically seal a space where the opening and the outlet communicate with each other is preferably provided between the air duct and the bottom portion of the housing case.

With the above-described configuration, the space where the opening and the outlet communicate with each other is hermetically sealed by the seal member, and flow of the condensation water from the communicating space into the housing space can be suppressed. In addition, entry of the vapor generated from the condensation water stored in the storage portion from the communicating space into the housing space can also be suppressed.

In the power storage device based on the present disclosure, the storage portion may be arranged in the housing case. In this case, the power storage device preferably further includes a separating member including one end and the other end, and having the one end connected to the storage portion and the other end connected to an inner wall surface of the housing case to thereby form the separated space. Furthermore, the air permeable film is preferably provided on the inner wall surface in a portion located inside at the other end.

With the above-described configuration, the separated space separated from the housing space can be easily formed by the separating member that connects the storage portion and the inner wall surface of the housing case. Furthermore, the air permeable film is provided on the inner wall surface of the housing case in the portion located inside on the other end side of the separating member, and thus, the vapor from the condensation water can be discharged from the air permeable film to the outside through the separated space separated from the housing space.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
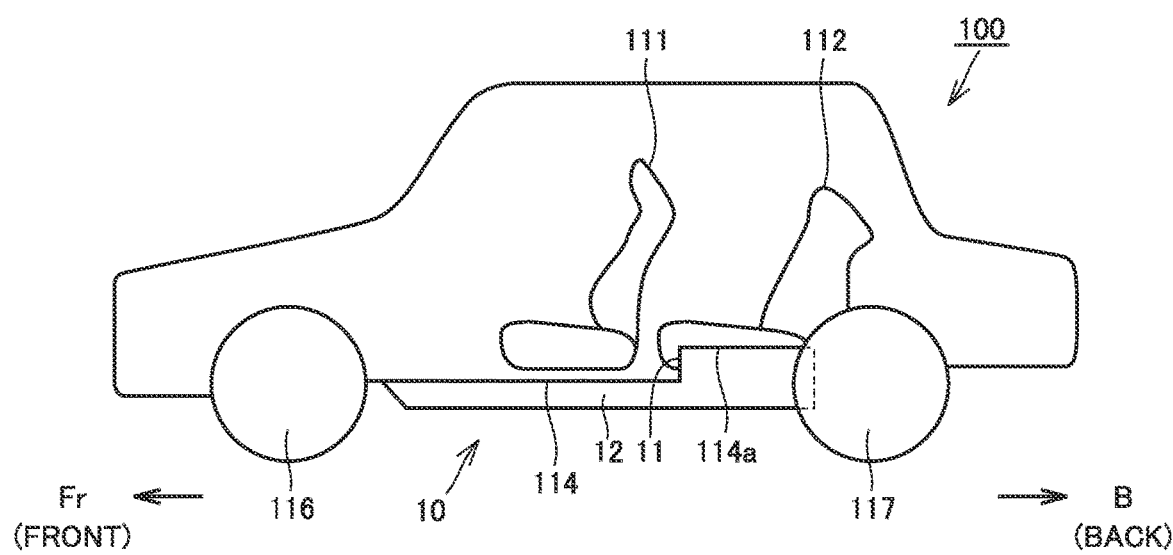
FIG. 1 shows a vehicle on which a battery pack according to a first embodiment is mounted.

Embodiments of the present disclosure will be described in detail hereinafter with reference to the drawings. The embodiments will be described below by way of example in connection with a battery pack, as a power storage device, mainly including a cell stack and a housing case configured to house the cell stack. In the embodiments described below, the same or common portions are denoted by the same reference characters in the drawings, and description thereof will not be repeated.

First Embodiment

FIG. 1 shows a vehicle on which a battery pack according to a first embodiment is mounted. A vehicle 100 having a battery pack 10 mounted thereon will be described with reference to FIG. 1.

As shown in FIG. 1, vehicle 100 is, for example, an electric vehicle and includes an electric motor as a prime mover for driving the vehicle. Vehicle 100 has a front seat 111, a rear seat 112, a floor panel 114, a front wheel 116, a rear wheel 117, and battery pack 10. Battery pack 10 is configured by electrically serially connecting a plurality of cell stacks 30 described below, and thus, battery pack 10 can supply electric power to the electric motor at high output.

Floor panel 114 is a panel member forming a floor surface of vehicle 100. Floor panel 114 has an upwardly-bulging portion 114a on the lower side of rear seat 112. Battery pack 10 has an upper portion 11 and a lower portion 12. Upper portion 11 is arranged below bulging, portion 114a. Battery pack 10 as a whole is arranged below floor panel 114.

Figure 2:
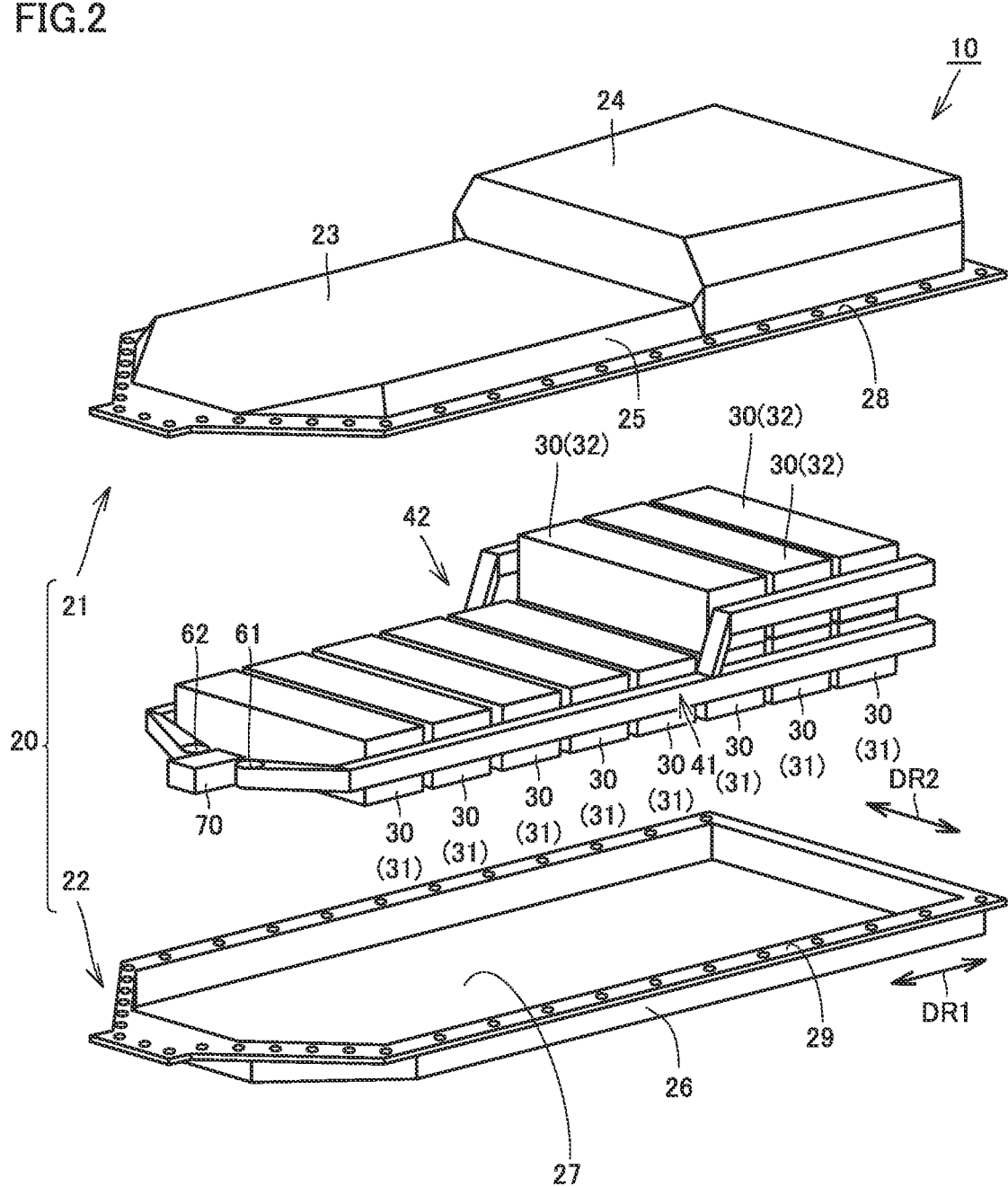
FIG. 2 is an exploded perspective view of the battery pack according to the first embodiment.
Figure 3:
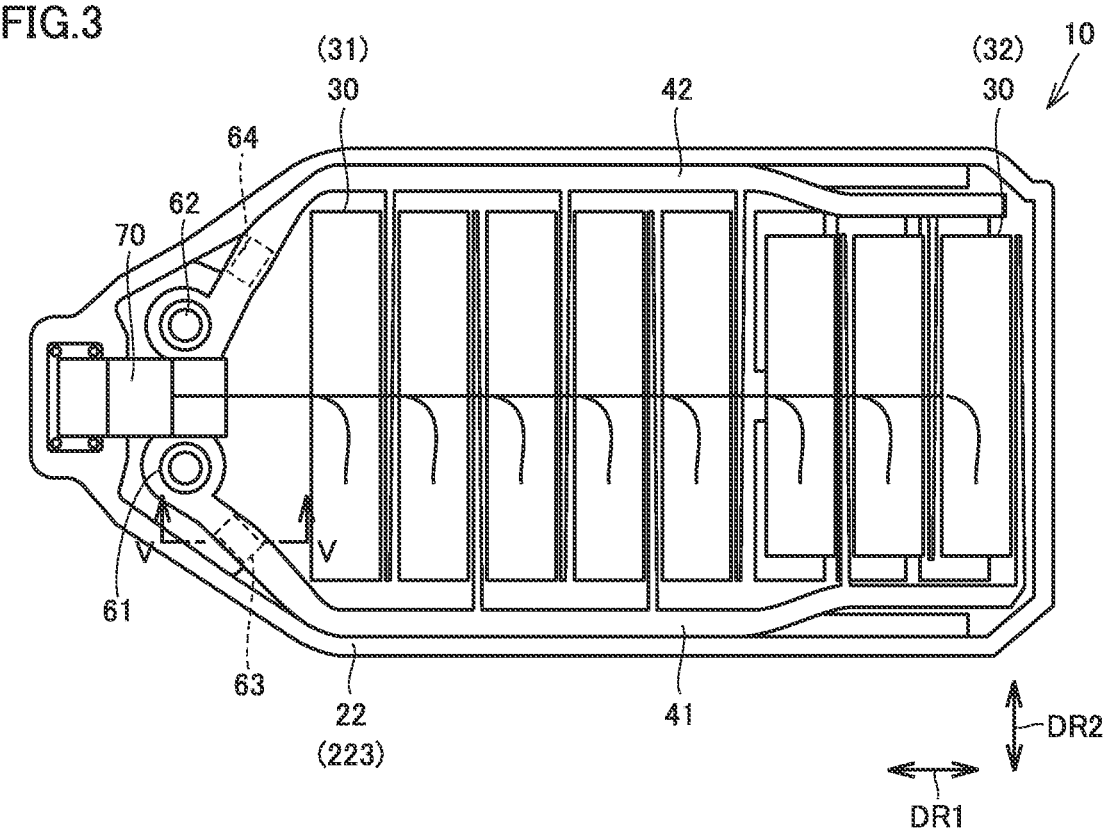
FIG. 3 is a plan view of the battery pack according to the first embodiment, with an upper case removed.

FIG. 2 is an exploded perspective view of the battery pack according to the first embodiment. FIG. 3 is a plan view of the battery pack according to the first embodiment, with an upper case removed. A configuration of battery pack 10 will be described with reference to FIGS. 2 and 3.

Battery pack 10 includes a housing case 20, a plurality of cell stacks 30, a first air duct 41, a second air duct 42, a first blower 61, a second blower 62, coolers 63 and 64, and an electronic device 70.

Housing case 20 is formed of a case body that forms a housing space therein, and has an appearance extending in a horizontal direction, with an up-down direction corresponding to a thickness direction. Housing case 20 extends along a first direction (DR1 direction) and has a longitudinal shape. The first direction is parallel to a vehicle front-back direction in a mounted state in which battery pack 10 is mounted. In housing case 20, a second direction (DR2 direction) orthogonal to the first direction is a shorter side direction. The second direction is parallel to a vehicle width direction in the above-described mounted state.

The plurality of cell stacks 30, first air duct 41, second air duct 42, first blower 61, second blower 62, coolers 63 and 64, and electronic device 70 are housed in housing case 20.

Housing case 20 has an upper case 21 and a lower case 22. Upper case 21 has a box shape that is open downwardly. Upper case 21 has a ceiling portion 23, a sidewall portion 25 and a flange portion 28. Ceiling portion 23 forms an upper wall of housing case 20. Ceiling portion 23 has a raised portion 24. Raised portion 24 has a shape of being raised upwardly in ceiling portion 23. Raised portion 24 is provided on the vehicle back side. A plurality of second cell stacks 32 described below are housed in raised portion 24. Sidewall portion 25 is provided to extend downwardly from an outer peripheral edge of ceiling portion 23. Flange portion 28 extends from a lower end of sidewall portion 25 to the outside of housing case 20, thereby forming a flange shape.

Lower case 22 has a box shape that is open upwardly. Lower case 22 has bottom portion 27 described below, a sidewall portion 26 and a flange portion 29. Bottom portion 27 is provided to face ceiling portion 23 in the up-down direction. Sidewall portion 26 is provided to extend upwardly from an outer peripheral edge of bottom portion 27. Sidewall portion 26 forms a sidewall of housing case 20, together with sidewall portion 25 of upper case 21. Flange portion 29 extends from an upper end of sidewall portion 26 to the outside of housing case 20, thereby forming a flange shape.

With flange portion 28 and flange portion 29 being stacked in the up-down direction, flange portion 28 and flange portion 29 are fastened by a plurality of fastening members (not shown). As a result, upper case 21 and lower case 22 are integrally coupled to each other and form the housing space for housing the plurality of cell stacks 30 and the like.

The plurality of cell stacks 30 include a plurality of first cell stacks 31 and a plurality of second cell stacks 32. The plurality of first cell stacks 31 are spaced apart from one another and arranged side by side in the first direction. Each of first cell stacks 31 is configured by a plurality of cells arranged side by side in the second direction.

The plurality of second cell stacks 32 are spaced apart from one another and arranged side by side in the first direction. The plurality of second cell stacks 32 are located above the plurality of first cell stacks 31. The plurality of second cell stacks 32 are arranged on the other side (vehicle back side in the above-described mounted state) in the first direction.

Each cell included in first cell stack 31 and second cell stack 32 is, for example, a secondary battery such as a nickel-metal hydride battery or a lithium ion battery. The cell has, for example, a rectangular shape. The shape of the cell is not limited to the rectangular shape and may be a cylindrical shape. The secondary battery may be a battery including a liquid electrolyte, or a battery including a solid electrolyte.

First air duct 41 and second air duct 42 are configured to feed the cooling air to the plurality of cell stacks 30. First air duct 41 and second air duct 42 are routed to be capable of feeding the cooling air to the plurality of cell stacks 30.

First air duct 41 and second air duct 42 extend along the first direction. First air duct 41 and second air duct 42 are spaced apart from each other in the second direction. The plurality of cell stacks 30 are arranged between first air duct 41 and second air duct 42.

First air duct 41 and second air duct 42 are formed of, for example, a heat insulating member. A resin member having a heat insulating property, a foamed resin member or the like can, for example, be used as the heat insulating member.

By allowing first air duct 41 and second air duct 42 to have the heat insulating property, heat transfer between cooling air flowing inside first air duct 41 or second air duct 42 and surrounding atmosphere of first air duct 41 or second air duct 42 can be reduced. As a result, cooling efficiency can be improved, the occurrence of condensation on outer surfaces of first air duct 41 and second air duct 42 can be suppressed, and adhesion of the condensation water to the plurality of cell stacks 30 can be suppressed.

First blower 61 sends the cooling air into first air duct 41. Second blower 62 sends the cooling air into second air duct 42. First blower 61 and second blower 62 are arranged side by side along the second direction. First blower 61 and second blower 62 are located on the other side (vehicle front side in the mounted state) in the first direction with respect to the plurality of cell stacks 30. A fan and a blower can, for example, be used as first blower 61 and second blower 62.

Coolers 63 and 64 are arranged in housing case 20 and cool the air sent toward the plurality of cell stacks 30. A heat exchanger for cooling such as an evaporator can, for example, be used as coolers 63 and 64.

Cooler 63 is, for example, arranged in first air duct 41. Cooler 63 performs heat exchange between the air fed by first blower 61 and a refrigerant flowing through cooler 63. At this time, the refrigerant deprives the surroundings of heat to thereby cool the air flowing through first air duct 41. The cooled air is fed through first air duct 41 to the plurality of cell stacks 30.

Cooler 64 is, for example, arranged in second air duct 42. Cooler 64 performs heat exchange between the air fed by second blower 62 and a refrigerant flowing through cooler 64. At this time, the refrigerant deprives the surroundings of heat to thereby cool the air flowing through second air duct 42. The cooled air is fed through second air duct 42 to the plurality of cell stacks 30.

Electronic device 70 is located on one side in the first direction with respect to the plurality of cell stacks 30. Electronic device 70 is arranged above bottom portion 27 of lower case 22. Electronic device 70 is arranged between first blower 61 and second blower 62.

A wire harness from the plurality of cell stacks 30 is connected to electronic device 70. Electronic device 70 is, for example, a junction box.

Figure 4:
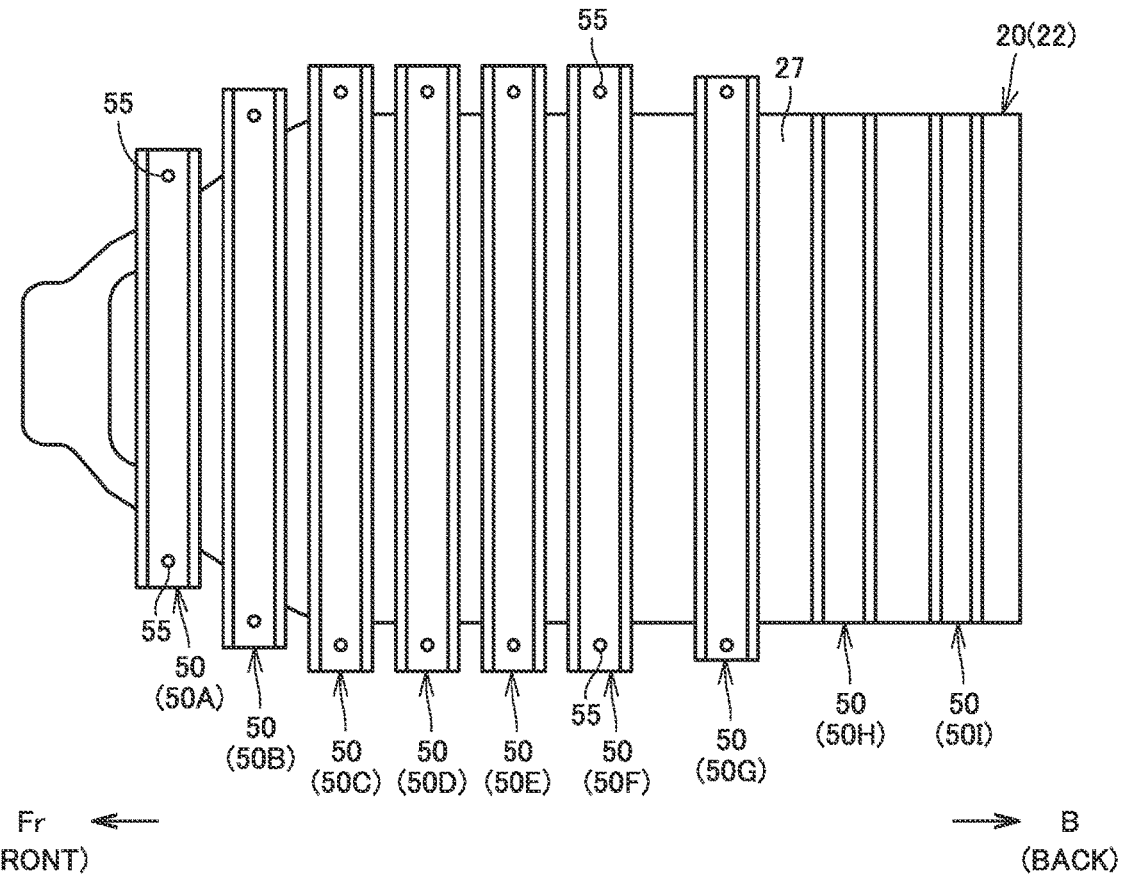
FIG. 4 is a bottom view of the battery pack according to the first embodiment.

FIG. 4 is a bottom view of the battery pack according to the first embodiment. A configuration of battery pack 10 according to the first embodiment on the bottom side will be described with reference to FIG. 4.

As shown in FIG. 4, battery pack 10 further includes a plurality f protective members 50 (50A, 50B, 50C, 50D, 50E, 50F, 50G, 50H, and 50I).

Protective members 50 are provided on bottom portion 27. Protective members 50 are arranged on an outer side of housing case 20. Protective members 50 are fixed to bottom portion 27 from the outer side of housing case 20. Protective members 50 may be fixed to bottom portion 27 by welding, or may be fixed to bottom portion 27 by fastening members such as bolts.

The plurality of protective members 50 are provided to be parallel to one another. The plurality of protective members 50 are spaced apart from one another in the first direction. The plurality of protective members 50 extend along the second direction of vehicle 100.

Protective member 50A, protective member 50B, protective member 50C, protective member SOD, protective member 50E, protective member 50F, protective member 50G, protective member 50H, and protective member 50I are arranged side by side from one side (vehicle front side) in the first direction to the other side (vehicle back side) in the first direction in the listed order.

Each of protective members 50 is formed of a frame member extending in the second direction. Protective members 50 (more specifically, protective member 50A, protective member 50B, protective member 50C, protective member 50D, protective member 50E, protective member 50F, and protective member 50G) are provided to protrude in the second direction from bottom portion 27.

A portion of each protective member 50 protruding from bottom portion 27 is provided with a bolt insertion hole 55.

Each of protective members 50 is fixed to a side member of vehicle 100 by a bolt inserted into bolt insertion hole 55.

Protective members 50 are provided to face, in the up-down direction, a road surface on which vehicle 100 travels. Protective members 50 are arranged between housing case 20 and the road surface. Thus, when battery pack 10 interferes with the road surface, protective members 50 are subjected to shock. Therefore, the plurality of cell stacks 30 arranged in housing case 20 can be appropriately protected against the shock from the road surface.

Figure 5:
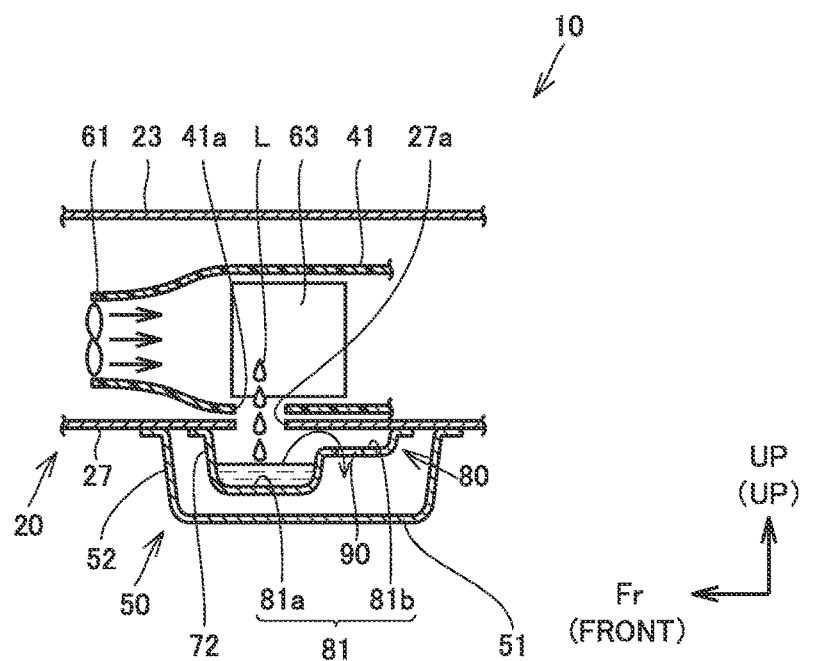
FIG. 5 is a schematic cross-sectional view showing a configuration around a cooler included in the battery pack according to the first embodiment.
Figure 6:
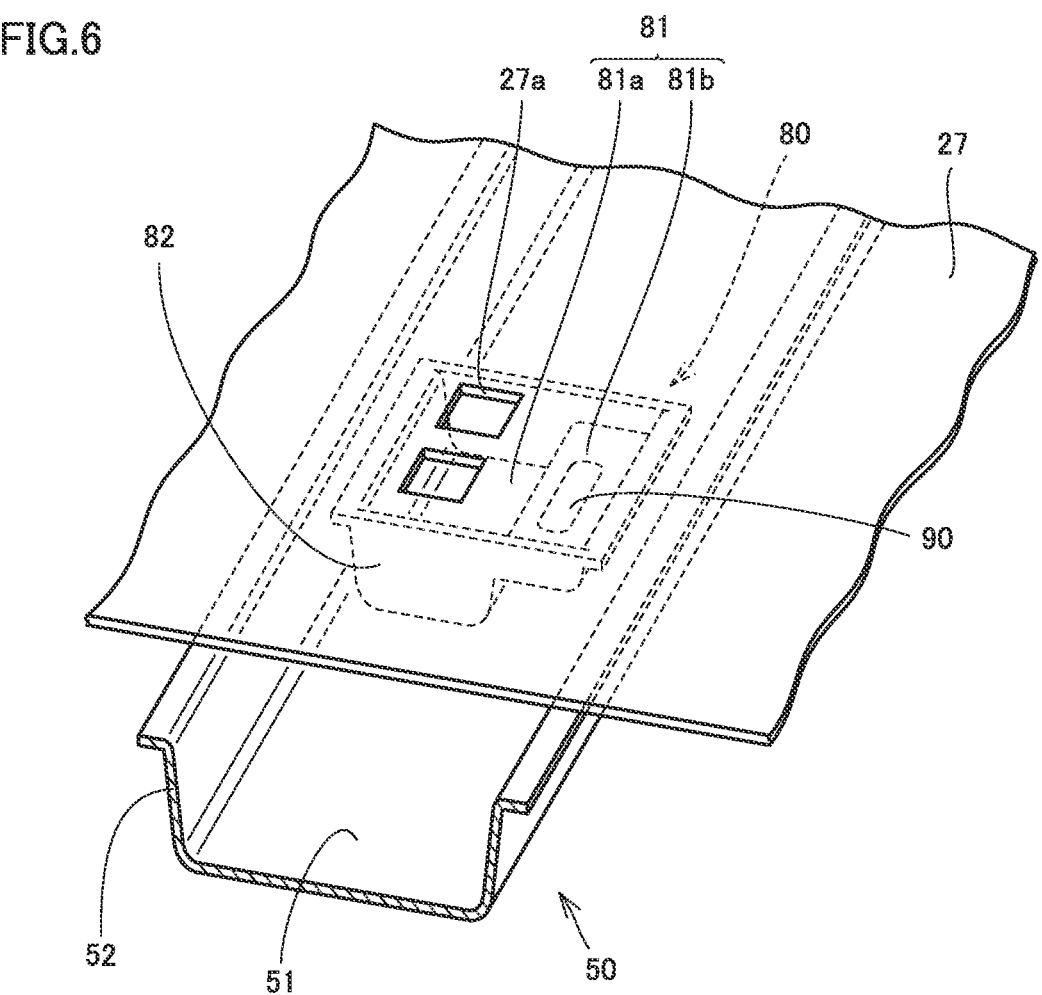
FIG. 6 is a perspective view showing a configuration around a storage portion included in the battery pack according to the first embodiment.

FIG. 5 is a schematic cross-sectional view showing a configuration around the cooler included in the battery pack according to the first embodiment. FIG. 6 is a perspective view showing a configuration around a storage portion included in the battery pack according to the first embodiment. The configuration around the cooler will be described with reference to FIGS. 5 and 6. Since the configuration around cooler 63 on the first air duct 41 side is substantially similar to the configuration around cooler 64 on the second air duct 42 side, the configuration around cooler 63 on the first air duct 41 side will be described.

As shown in FIGS. 5 and 6, battery pack 10 further includes a storage portion 80 and an air permeable film 90.

Storage portion 80 is attached to the outer side of housing case 20 and is provided in a space separated from the housing space in housing case 20. Storage portion 80 has a substantially box shape that is open upwardly. Storage portion 80 is provided to cover an opening 27a provided in bottom portion 27 of housing case 20 from the lower side of bottom portion 27.

Storage portion 80 is configured to store condensation water L generated by cooler 63. Condensation water L is generated on a surface of cooler 63 when the air flowing through first air duct 41 is cooled by cooler 63.

Condensation water L adhering to the surface of cooler 63 drips downwardly from cooler 63. First air duct 41 is provided with an outlet 41a through which condensation water L having dripped from cooler 63 is discharged. Outlet 41a is provided below cooler 63.

Outlet 41a is configured to guide condensation water L to opening 27a provided in bottom portion 27 of housing case 20.

Outlet 41a is provided in first air duct 41 provided to pass through an upper part of above-described opening 27a, and is provided to face opening 27a. Condensation water L discharged through outlet 41a is guided through opening 27a to storage portion 80.

Specifically, storage portion 80 has a bottom wall portion 81 facing bottom portion 27, and a peripheral wall portion 82 provided to rise from a peripheral edge of bottom wall portion 81 and connected to bottom portion 27.

Bottom wall portion 81 has a storage surface 81a and a placement surface 81b. Storage surface 81a defines a storage region where condensation water L having passed through above-described opening 27a is stored.

Placement surface 81b is provided to be adjacent to storage surface 81a when viewed from above. Placement surface 81b is arranged on the other side in the first direction with respect to storage surface 81a when viewed from above. Placement surface 81b is located above storage surface 81a. Placement surface 81b is provided not to be immersed in the condensation water stored in the storage region.

Placement surface 81b is provided with air permeable film 90. Air permeable film 90 is a film having the property of allowing the water to be blocked and the air to pass therethrough. Gore-Tex (registered trademark) or the like can, for example, be used as air permeable film 90.

Air permeable film 90 is high in waterproof durability, windproof property and moisture permeability. Air permeable film 90 suppresses intrusion of a foreign substance such as water and dust into storage portion 80. In addition, air permeable film 90 allows a vapor generated from the condensation water stored in storage portion 80 to pass therethrough and be discharged outside storage portion 80.

Protective member 50 is provided to cover storage portion 80 from the lower side. Since protective member 50 covers storage portion 80, storage portion 80 can be protected and interference with the road surface can be suppressed. It is also possible to prevent a foreign substance such as mud on the road surface splashed by front wheel 116 and rear wheel 117 from adhering to air permeable film 90 provided in storage portion 80. As a result, a reduction in vapor discharge performance can be suppressed.

Specifically, protective member 50 includes a base portion 51 and a pair of leg portions 52. Base portion 51 is provided below bottom portion 27 at a distance therefrom. Base portion 51 is also provided below bottom wall portion 81 of storage portion 80 at a distance therefrom. Base portion 51 is provided to be parallel to bottom portion 27.

The pair of leg portions 52 extend upwardly from both ends of base portion 51 in the first direction and abut on bottom portion 27 at ends of the pair of leg portions 52. The pair of leg portions 52 are spaced apart from each other in the first direction.

A space is provided between bottom portion 27 and protective member 50, and the vapor from the condensation water having passed through air permeable film 90 is discharged to the outside through the space.

As described above, in battery pack 10 according to the present embodiment, storage portion 80 configured to store the condensation water generated as a result of cooling by cooler 63 and air permeable film 90 are provided in the separated space separated from the housing space in housing case 20, and the vapor evaporated from the condensation water passes through the separated space and reaches air permeable film 90.

With such a configuration, the condensation water generated as a result of cooling by the cooler can be stored in storage portion 80 provided in the separated space separated from the housing space in housing case 20, and the vapor generated from the condensation water can be discharged from air permeable film 90 to the outside through the separated space separated from the housing space.

Therefore, storage of the condensation water in the housing space in housing case 20 and accumulation of the vapor generated from the condensation water in the housing space can be suppressed, and adhesion of the condensation water to the plurality of cell stacks 30, electronic device 70 and the like housed in housing case 20 can be suppressed. As a result, a short circuit of the plurality of cell stacks 30 and electronic device 70 can be suppressed. In addition, with such a configuration that the vapor reaches air permeable film 90 provided in the separated space, submersion of air permeable film 90 in the condensation water can be suppressed, and the vapor can be reliably discharged outside storage portion 80.

By providing the separated space separated from the housing space as described above, the vapor from the condensation water stored in storage portion 80 can be discharged outside, without requiring a humidifier and the like, and thus, the vapor from the condensation water can be discharged outside with a simple configuration. Furthermore, an increase in humidity in the housing space can be suppressed, and re-condensation of the vapor generated in the housing space can be suppressed.

Furthermore, storage portion 80 is provided to cover opening 27a provided in bottom portion 27 of housing case 20 from the lower side, and thus, the separated space can be easily formed by storage portion 80. In addition, the condensation water going downward by gravity can be moved from opening 27a toward storage portion 80. Furthermore, in bottom wall portion 81 of storage portion 80, placement surface 81b on which air permeable film 90 is placed is provided above storage surface 81a defining the storage region where the condensation water is stored, and thus, submersion of air permeable film 90 in the condensation water can be suppressed.

Second Embodiment

Figure 7:
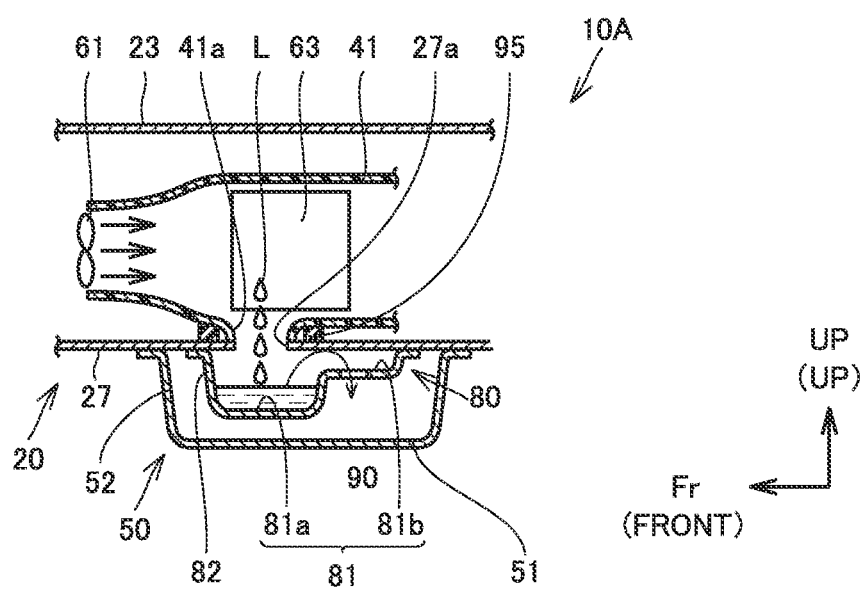
FIG. 7 is a schematic cross-sectional view showing a configuration around a cooler included in a battery pack according to a second embodiment.

FIG. 7 is a schematic cross-sectional view showing a configuration around a cooler included in a battery pack according to a second embodiment. A battery pack 10A according to the second embodiment will be described with reference to FIG. 7.

As shown in FIG. 7, battery pack 10A according to the second embodiment is different from battery pack 10 according to the first embodiment in that a seal member 95 is provided. The remaining configuration is substantially similar.

Seal member 95 has an annular shape. Seal member 95 is provided between first air duct 41 and bottom portion 27. First air duct 41 is routed to pass through an upper part of opening 27a provided in bottom portion 27, and seal member 95 hermetically seals a space where opening 27a and outlet 41a communicate with each other.

With the above-described configuration as well, battery pack 10A according to the second embodiment produces an effect that is substantially similar to that of battery pack 10 according to the first embodiment.

In addition, seal member 95 configured to hermetically seal the space where opening 27a and outlet 41a communicate with each other is provided, and thus, flow of the condensation water from the communicating space into the housing space in housing case 20 can be suppressed. In addition, entry of the vapor generated from the condensation water stored in storage portion 80 from the communicating space into the housing space can also be suppressed.

First Modification

Figure 8:
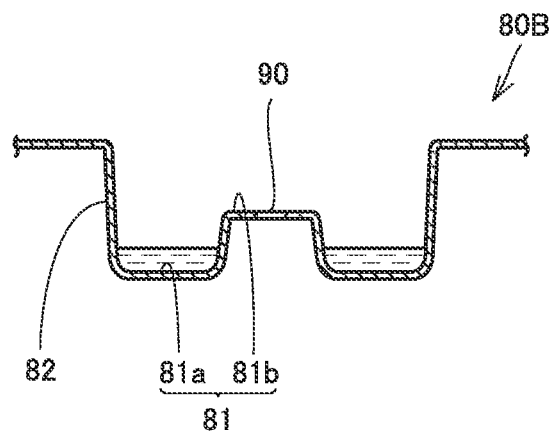
FIG. 8 is a cross-sectional view of a storage portion according to a first modification.
Figure 9:
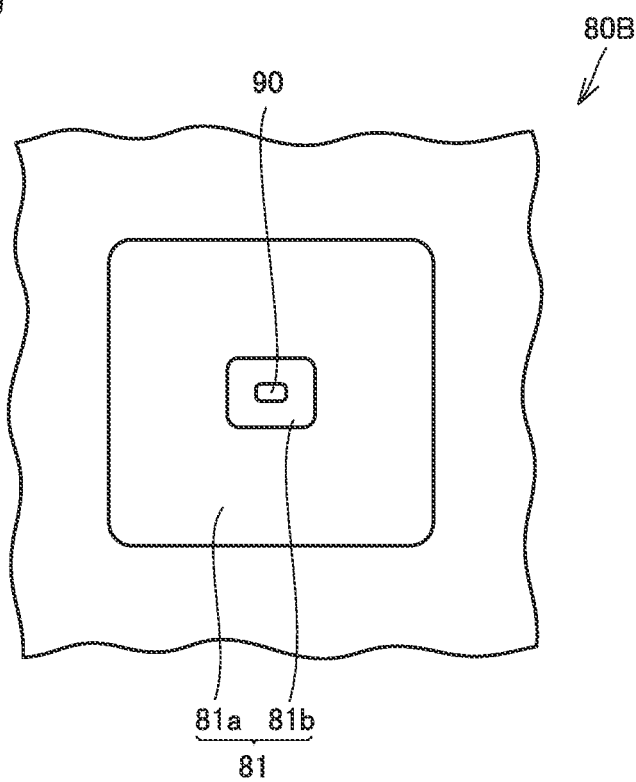
FIG. 9 is a plan view of the storage portion according to the first modification.

FIG. 8 is a cross-sectional view of a storage portion according to a first modification. FIG. 9 is a plan view of the storage portion according to the first modification. A storage portion 80B according to the first modification will be described with reference to FIGS. 8 and 9.

As shown in FIGS. 8 and 9, storage portion SOB according to the first modification may be used as a storage portion. Storage portion 80B according to the first modification is different in shape from storage portion 80 according to the first embodiment.

In the first modification, placement surface 81b is surrounded by storage surface 81a when viewed from above. In this case as well, placement surface 81b on which air permeable film 90 is provided is arranged above storage surface 81a. Placement surface 81b is provided not to be immersed in condensation water L stored in the storage region defined by storage surface 81a.

Even when such storage portion 80B is used, an effect that is substantially similar to that of battery pack 10 according to the first embodiment is obtained.

Third Embodiment

Figure 10:
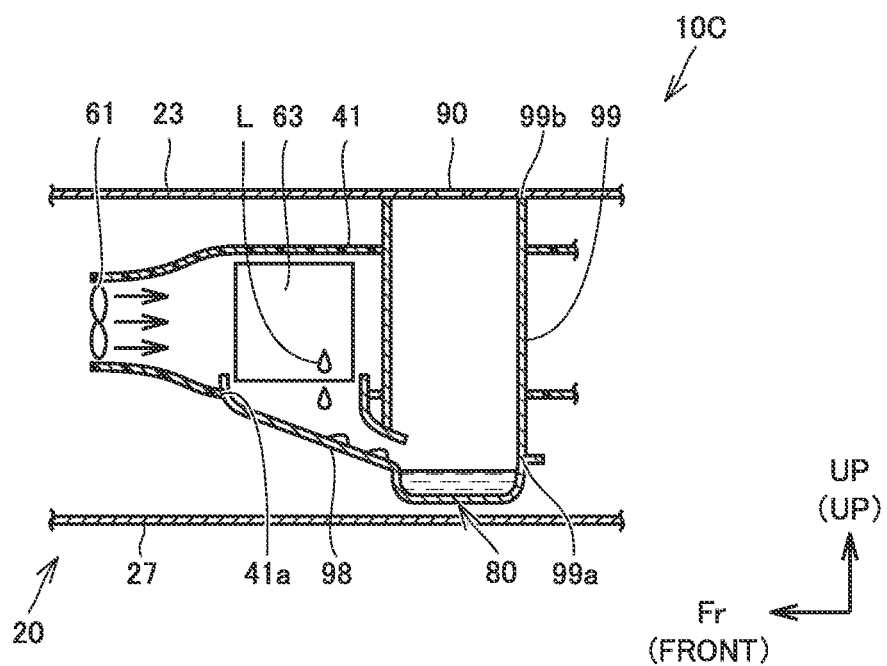
FIG. 10 is a schematic cross-sectional view showing a configuration around a cooler included in a battery pack according to a third embodiment.

FIG. 10 is a schematic cross-sectional view showing a configuration around a cooler included in a battery pack according to a third embodiment. A battery pack 10C according to the third embodiment will be described with reference to FIG. 10.

As shown in FIG. 10, battery pack 10C according to the third embodiment is different from battery pack 10 according to the first embodiment, mainly in a position where storage portion 80 and air permeable film 90 are placed, and in that a separating member 99 is provided. The remaining configuration is substantially similar.

Storage portion 80 is provided in housing case 20. A conveyance path 98 along which the condensation water is conveyed is provided below cooler 63. One end of conveyance path 98 is connected to outlet 41a provided in first air duct 41. The other end of conveyance path 98 is directed to storage portion 80. The condensation water generated as a result of cooling by cooler 63 is conveyed to storage portion 80 along conveyance path 98.

Battery pack 10C according to the third embodiment includes separating member 99. Separating member 99 has a tubular shape. Separating member 99 has one end 99a and the other end 99b. One end 99a of separating member 99 is connected to storage portion 80. The other end 99b of separating member 99 is connected to an inner wall surface of ceiling portion 23 of housing case 20. Separating member 99 is connected to storage portion 80 and the inner wall surface as described above, to thereby form a separated space separated from a housing space.

Although the case of the other end 99b of separating member 99 being connected to the inner wall surface of ceiling portion 23 has been described by way of example, the present disclosure is not limited thereto. As long as the separated space is formed as described above, the other end 99b of separating member 99 may be connected to an inner wall surface of sidewall portion 25, sidewall portion 26 or bottom portion 27.

Air permeable film 90 is provided on the above-described inner wall surface in a portion located inside at the other end 99b of separating member 99.

With the above-described configuration, in the third embodiment, the separated space separated from the housing space can be easily formed by separating member 99 that connects storage portion 80 and the inner wall surface of housing case 20. Furthermore, air permeable film 90 is provided on the inner wall surface of housing case 20 in the portion located inside on the other end 99h side of separating member 99, and thus, the vapor from the condensation water can be discharged from air permeable film 90 to the outside through the separated space separated from the housing space.

Although the first to third embodiments and the first modification have been described above by way of example in connection with the case in which coolers 63 and 64 are provided in first air duct 41 and second air duct 42, respectively, the present disclosure is not limited thereto. As long as coolers 63 and 64 can cool the air sent toward cell stacks 30, coolers 63 and 64 may be provided to be exposed from first air duct 41 and second air duct 42, respectively.

Furthermore, although the first to third embodiments and the first modification have been described above by way of example in connection with the case in which the power storage device is the battery pack including the cell stacks, the present disclosure is not limited thereto. A power storage device including a power storage module such as a capacitor that can store electric power can be used as appropriate.

While the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A power storage device comprising:
   a power storage module;
   a housing case having a housing space formed therein and configured to house the power storage module in the housing space;
   a cooler arranged in the housing case and configured to cool air sent toward the power storage module;
   a storage portion configured to store condensation water generated as a result of cooling by the cooler; and
   an air permeable film configured to allow a vapor generated from the condensation water stored in the storage portion to pass therethrough,
   the storage portion and the air permeable film being provided in a separated space separated from the housing space,
   the vapor passing through the separated space and reaching the air permeable film, wherein
   the housing case includes a bottom portion provided with an opening,
   the storage portion includes a bottom wall portion provided to cover the opening from a lower side of the bottom portion and facing the bottom portion, and a peripheral wall portion provided to rise from a peripheral edge of the bottom wall portion and connected to the bottom portion,
   the bottom wall portion includes a storage surface defining a storage region where the condensation water having passed through the opening is stored, and a placement surface located above the storage surface and having the air permeable film placed thereon, and
   the placement surface is located below the bottom portion of the housing.

2. The power storage device according to claim 1, further comprising
   a protective member provided to cover the storage portion from the lower side.

3. The power storage device according to claim 1, further comprising
   an air duct arranged in the housing case so as to be located above the opening, and configured to allow the air sent toward the power storage module to flow therethrough, wherein
   the cooler is arranged in the air duct,
   the air duct is provided with an outlet configured to guide the condensation water to the opening, and
   a seal member configured to hermetically seal a space where the opening and the outlet communicate with each other is provided between the air duct and the bottom portion of the housing case.

* * * * *